United States Patent
Christensen et al.

(10) Patent No.: US 6,766,054 B1
(45) Date of Patent: Jul. 20, 2004

(54) SEGMENTATION OF AN OBJECT FROM A BACKGROUND IN DIGITAL PHOTOGRAPHY

(75) Inventors: James Edward Christensen, Cortlandt Manor, NY (US); Alan George Cole, Katonah, NY (US); Ravishankar Rao, Elmsford, NY (US)

(73) Assignee: International Business Machines Corporation, Armonk, NY (US)

(*) Notice: Subject to any disclaimer, the term of this patent is extended or adjusted under 35 U.S.C. 154(b) by 706 days.

(21) Appl. No.: 09/638,159

(22) Filed: Aug. 14, 2000

(51) Int. Cl.[7] ............................ G06K 9/34; G06K 9/36; H04N 9/74
(52) U.S. Cl. ..................... 382/173; 382/280; 348/586; 348/587; 348/590; 348/591
(58) Field of Search ........................... 382/173, 280; 348/586–587, 590–591

(56) References Cited

U.S. PATENT DOCUMENTS

| | | | |
|---|---|---|---|
| 5,140,416 A | * 8/1992 | Tinkler | 348/33 |
| 5,345,313 A | * 9/1994 | Blank | 348/598 |
| 5,448,651 A | 9/1995 | Sakou et al. | |
| 5,481,095 A | * 1/1996 | Mitsuda et al. | 235/454 |
| 5,502,482 A | * 3/1996 | Graham | 348/140 |
| 5,561,611 A | * 10/1996 | Avinash | 702/111 |
| 5,606,821 A | 3/1997 | Sadjadi et al. | |
| 5,699,452 A | 12/1997 | Vaidyanathan | |
| 6,034,740 A | * 3/2000 | Mitsui et al. | 348/587 |
| 6,271,890 B1 | * 8/2001 | Tamir et al. | 348/587 |
| 6,307,975 B1 | * 10/2001 | Hosaka et al. | 382/243 |
| 6,556,784 B2 | * 4/2003 | Onuki | 396/52 |

OTHER PUBLICATIONS

Cutler, R. and Davis,L.; View–Based Detection and Analysis of Periodic Motion, Pattern Recognition, 1998. Proceedings. Fourteenth International Conference on, vol.: 1, Aug. 16–20, 1998, pp. 495–500.*

* cited by examiner

*Primary Examiner*—Leo Boudreau
*Assistant Examiner*—Hussein Akhavannik
(74) *Attorney, Agent, or Firm*—L. P. Herzberg; E. W. Petraske

(57) ABSTRACT

The present invention provides methods and apparatus to distinguish and/or separate an object from a background. The methods use backgrounds of known and/or advantageous texture. In an embodiment, a measure of image texture, namely the spatial frequency is used to distinguish and/or separate an object from its background. The use of image texture overcomes limitations of chroma keying used as a processing technique in photography for object-background separation. This is useful in the separation of image pixels belonging to the object of interest from image pixels belonging to the background.

16 Claims, 4 Drawing Sheets

SEGMENTATION OF AN OBJECT FROM A BACKGROUND IN DIGITAL PHOTOGRAPHY

FIELD OF THE INVENTION

The present invention is directed to digital photography. It is more particularly directed to separating objects of interest from the background of a photograph or digitized image.

BACKGROUND OF THE INVENTION

The field of digital photography is growing rapidly because of the availability of inexpensive digital cameras and low cost personal computers to process the digitally acquired images. One of the areas where digital photography is seeing increased use in studio photography, where objects of interest are placed in a controlled environment. This environment includes specific studio lighting and backgrounds. Since an image of the object is acquired digitally rather than on film, this digital image is subject to several digital image processing techniques on a computer to improve its appearance. This is advantageous in that the processing can be performed almost instantaneously without the many steps required with film-based media.

A frequently used processing technique is that of object-background separation. This results in the separation of those image pixels belonging to the object of interest from the background. Since this separation takes place with a visual image of the object, rather than a physical separation of the object from the background, we refer to this as visual separation. Visual separation frees the image of the object from the background, so that the object can be superimposed on other backgrounds at a later time. For instance, it may be desirable to place the objects on white backgrounds for printed catalogs, whereas it may be desirable to place the objects on a black background for web-based publishing. Isolating an object from its background gives one flexibility to change the background as desired.

Methods for separating an object from its background generally define characteristics or properties of the object and background that are distinct from one another. For instance, color is one such characteristic or property. A commonly used technique to perform object-background separation is that of chroma keying. This technique groups areas within an image based on color similarity. More generally, assume the digital image is represented in one of the popular color spaces: RGB, YCrCb, LAB, LUV, HSB, CMY, or CMYK. Then the generalization of the chroma-keying idea is to segment the image into selected pixels that lie within a fixed distance from a distinguished point in this space, and into non-selected pixels that have greater distance from the distinguished point. Many popular image processing programs provide tools that operate in this manner. In one case, this tool not only allows for the selection of the distinguished point in the color space and the distance from that point, but optionally refines the segmentation by adding the constraint that all selected pixels must be contiguous. This requires that related pixels must either be neighbors of a selected pixel, or be neighbors of defined neighbors of that pixel, etc.

There are several disadvantages in the practical use of chroma-keying. Lighting variations and shadows can cause errors in the measurement of color. Furthermore, if the object is shiny, it can reflect the color of the background, causing mislabeling of object pixels.

It is advantageous to have a method that overcomes these and other limitations of chroma-keying. Manual segmentation, in which a human painstakingly outlines the object is a time consuming process.

Texture is a characteristic or property of an object or background. As used herein, image texture is defined as 'the surface markings or two dimensional appearance of a surface'. It is well known that image texture (or texture characteristic) is an important image characteristic used by the human visual system as a cue in differentiating objects from each other. In fact, if the image is monochromatic, such as black and white, texture provides significant information in separating different objects from each other. Other cues such as continuity and perceptual grouping are also used by the human visual system, but these are typically higher level processes. There are few computational techniques that use such higher level cues in a robust, repeatable fashion. On the other hand, image texture has been widely studied from a computational standpoint and there are several image texture measures that work well in practice.

A texture discrimination method which separates characters from background in the headline areas of documents is limited to character recognition. A system for weed recognition and identification utilizes image segmentation. The segmentation is performed by means of a sensor to detect green vegetation and classify green image regions based on their shape and texture. Another method for segmenting an object from its background using texture information performs segmentation using entropic thresholding.

It would be quite advantageous to be able to perform object-background separation in a way that does not depend on color information alone.

SUMMARY OF THE INVENTION

It is therefore an object of the present invention to provide methods and apparatus for object-background separation using texture information and/or characteristics.

An aspect of the invention provides a method for visual separation. The method includes providing a digitized image of at least one object upon a textured background, and employing a texture characteristic in separating at least one object in the image from the textured background and/or background region.

Another aspect of the invention is provision of an apparatus for separating at least one object in the image from the textured background. In a particular embodiment, the apparatus includes a digital camera system; a lens optically coupled to the digital camera system for capturing a digitized image. The digital camera has an output coupled to a computer. The computer having code of a program for effecting the visual separation of at least one object upon a textured background included in the digitized image.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF THE INVENTION

The present invention provides methods and apparatus for object separation which use a background or background region of known texture using texture discrimination methods. An advantage of using a texture discrimination method is that it can be applied to different images equally well, so that the method is relatively immune to lighting variations. For the purposes of this invention, an object is said to be within or upon a background even if the object abuts the boundary of the background.

Use of a texture measurement scheme in accordance with the present invention provides a more robust technique than just using a pure color measuring scheme for segmentation. This is because image texture is a property of a finite area of the image, whereas color is a point property. Thus although, one can define the color for a single pixel, the texture cannot be defined for a single pixel. One needs a meaningful image area of at least two pixels, and typically a 5×5 or 7×7 area to define image texture.

Figure 1:
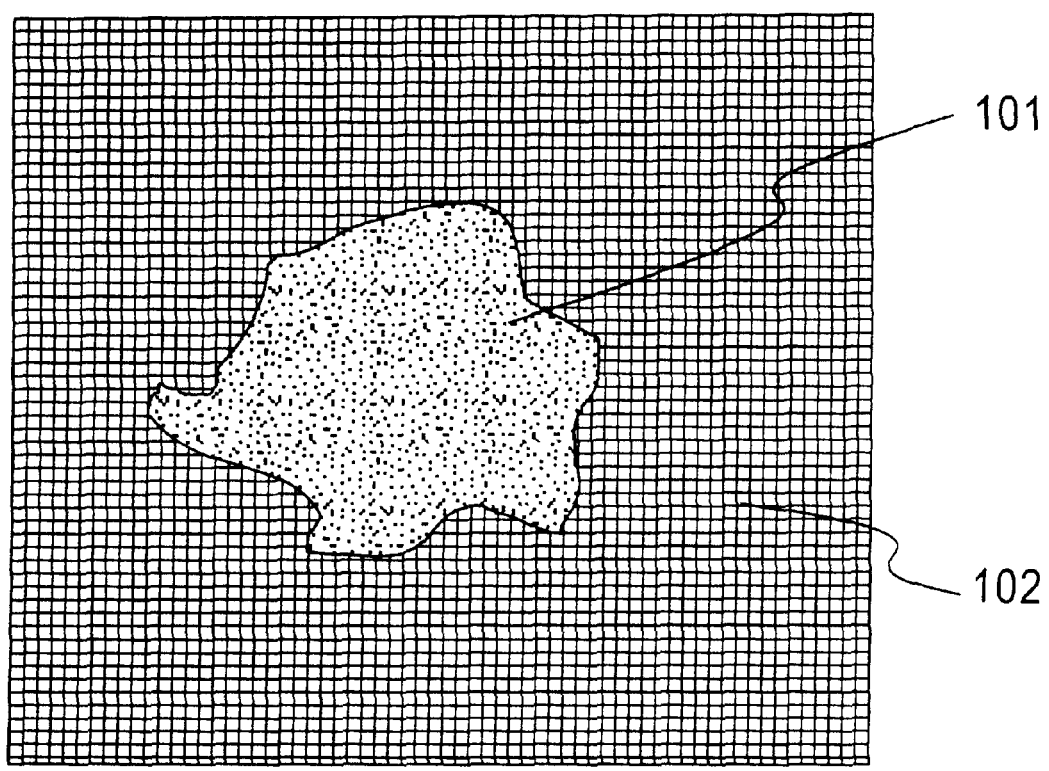
FIG. 1 represents an example of a method to perform object-background separation using texture-based methods in accordance to the present invention.

FIG. 1, shows an object 101 superimposed on a known background 102. The background 102 contains a texture of constant frequency. The term frequency refers to patterns that repeats over the spatial dimensions of the image. This frequency is also known as the spatial frequency of the texture, and is measured in cycles per unit distance. The reason we use a constant spatial frequency texture in the embodiment shown, is because it has a simple spectral description. There is only one frequency present in the background 102 in the x and y directions. This makes it easy to design an algorithm to detect the presence of this known frequency. A desirable feature of this constant spatial frequency texture is that it should require only a small number of image samples to determine the frequency. Thus, it is advantageous that this texture be highly spatially localized so it can be measured with a small sampling window.

An example of a low spatial frequency texture is one in which the image intensity repeats over a cycle of 50 pixels for a size 512×512 image. In this case, one uses at least 50 samples to determine the frequency. However, if the frequency of the texture is high, such as 5 pixels per cycle for the same 512×512 size image, one could use only 5 samples to determine the frequency. Thus, the high frequency checkboard shown in FIG. 1 is an example of an advantageous background to use.

We further describe an embodiment to detect the presence of this frequency in a given portion of the image. Depending on the distance between the camera and the background, the measured frequency of the checkerboard background may change. The frequency is determined using any method known to those skilled in the art. This includes methods for segmenting and descreening of documents by capturing an image of the background without any object present.

The frequency of repetition can alternatively be described as a repetition period in pixels, since these are inverses of one another. Let this estimated periodicity be 'px' in the x direction and 'py' in the y direction. Ideally 'px' and 'py' are equal for a checkerboard pattern, but we allow for some distortions in the image capture process. We can then select a sampling window of size M×N consisting of 'M' rows and 'N' columns and sample the image pixel values within this window. This window is then moved across the image in a raster order such that successive windows are shifted one pixel apart. The choice of the parameters 'M' and 'N' depends on the estimated periodicities 'px' and 'py'. In order to speed up computation, we can choose M=1 and N=2*px for processing the image in the 'x' direction, and M=2*py and N=1 to process the image in the 'y', direction.

Consider an embodiment in which M=1 and N=2*px. We obtain a 1 dimensional sequence, say 's'. We can take the Fourier transform of 's', say 'S', and determine its power spectrum, say 'P'. The Fourier transform and Fourier power spectrum are well known techniques in signal processing, and these methods are familiar to those versed in the art. The power spectrum 'P' is searched for a strong component at the particular frequency 'fx' in the x direction. This indicates that the original sequence 's' is composed mainly of a periodic signal with period 'px'. One method for checking the power spectrum 'P' for a strong component at 'fx' finds the maximum value in the power spectrum. If it occurs at 'fx', and the ratio of the power spectrum at 'fx' with the next highest power spectral value is high (say greater than 10) then it indicates that the sequence 's' is composed mostly of a periodic signal with period 'px'. This indicates that the current pixel position at which the spectral estimation was performed is a background pixel. If the above test for a spectral peak at 'fx' fails, it indicates that the image pixel is an object pixel. An analogous method is used in the y direction.

This method checks for the strong presence of a single frequency in the power spectrum. In an analogous fashion we can check for the presence of two or more frequencies in the power spectrum. In this way, one are not restricted to a checkerboard pattern for the background texture. An advantage of using a checkerboard pattern is that we have to search for a single frequency rather than a band of frequencies.

Another embodiments uses a modification of the method. It uses a narrow spectral window centered around 'fx' and fy. In this way, small distortions in the background texture, say due to warp or perspective projection are still identified as belonging to the known background.

The spectral estimation is done at each pixel of the image. Each pixel is classified as belonging to the object or to the background. There is a pathological case in which this method will fail to perform the desired segmentation. This occurs when the object has exactly the same texture properties as the background. However, this is extremely unlikely to occur in practice. In an instance in which it does occur, the background is modified to have a different texture property or an alternate method is used to separate the object from the background.

Figure 2:
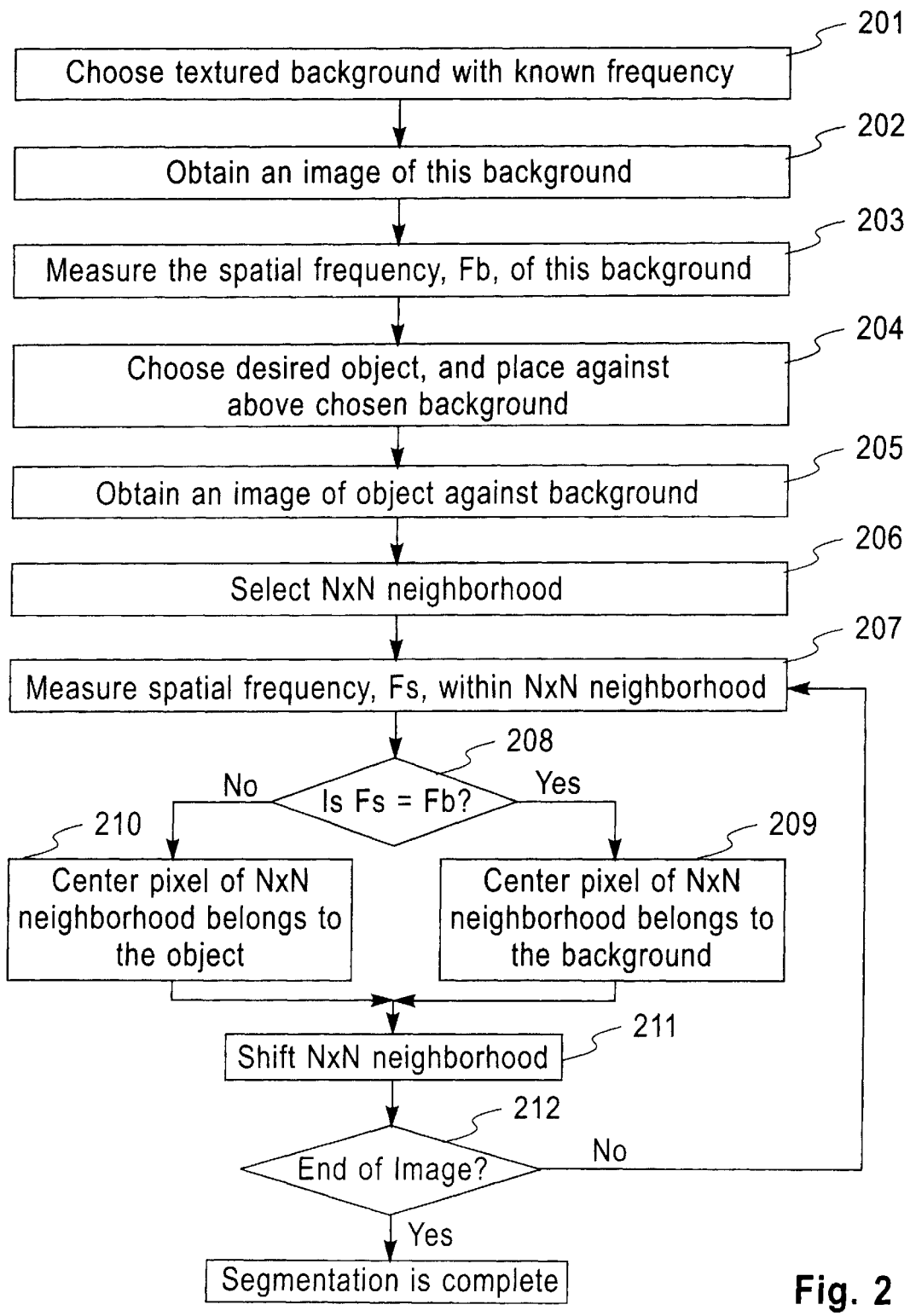
FIG. 2 shows an example of a flowchart describing processing steps used in accordance to the present invention.

FIG. 2 shows a flowchart for an example implementation of the method of the present invention. As shown in the figure, a textured background with known frequency is chosen 201. In some embodiments, this is a checkerboard pattern. A digital image is obtained of this background 202, using a suitable imaging device such as a scanner or digital camera. The spatial frequency of the background, 'Fb', 203 is measured in its digital image, using its Fourier power spectrum. The desired object to be photographed is placed against the background 204, and a digital image of the object against the background is obtained 205. We select an N×N sized neighborhood in the image 206 starting at the upper left corner. 'N' is chosen to be at least twice the repetition period, 1/Fb. For instance if the frequency 'Fb' is 0. 2 cycles per pixel, it indicates a periodicity of 5 pixels. 'N' is then chosen to be at least 10, say 11.

The spatial frequency, 'Fs', within the pixels of the N×N neighborhood of the image 207 is measured using the Fourier power spectrum. We compare 'Fs' with 'Fb' 208. If 'Fs' is equal to or very nearly equal to 'Fb', we declare the center pixel of the N×N neighborhood as belonging to the background 209. If 'Fs' is not equal or very nearly equal to 'Fb', we declare the center pixel of the N×N neighborhood as belonging to the object 210. The N×N neighborhood is then shifted in raster order 211 until the end of the image is reached 212. At each position of the N×N neighborhood, the computation of the frequency 'Fs' is carried out as described.

Figure 3:
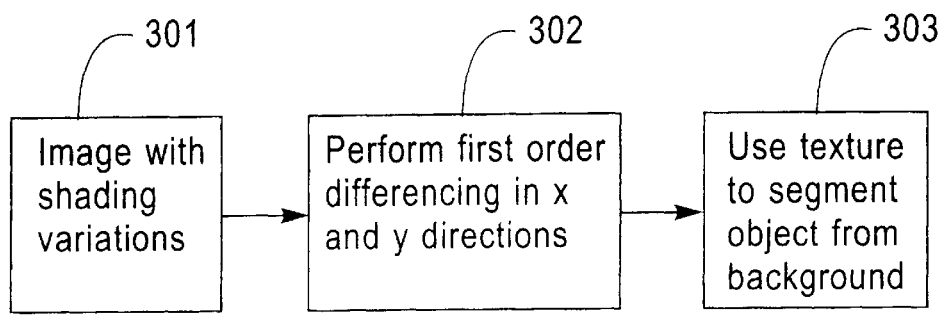
FIG. 3 shows an example of a method where first order differencing is applied to the input image in order to remove lighting variations in accordance to the present invention.

An alternate embodiment is useful in cases where there are significant shading variations, such as those caused when shadows of the object fall on the background. FIG. 3 illustrates an example of a method used in this case. The image with shading variations 301 is subjected to first order differencing 302, which removes the variations. First order differencing is a technique used in time-series analysis, and is also known as de-trending or de-seasonalizing. The resulting image is analyzed for determining the textured background 303 according to the flowchart in FIG. 2, using steps 206–212. An advantage of using first order differencing operation is in that the periodicity of the background texture is not changed by this operation. The operation reduces or eliminates shading variations while preserving the periodicity of the texture.

Figure 4:
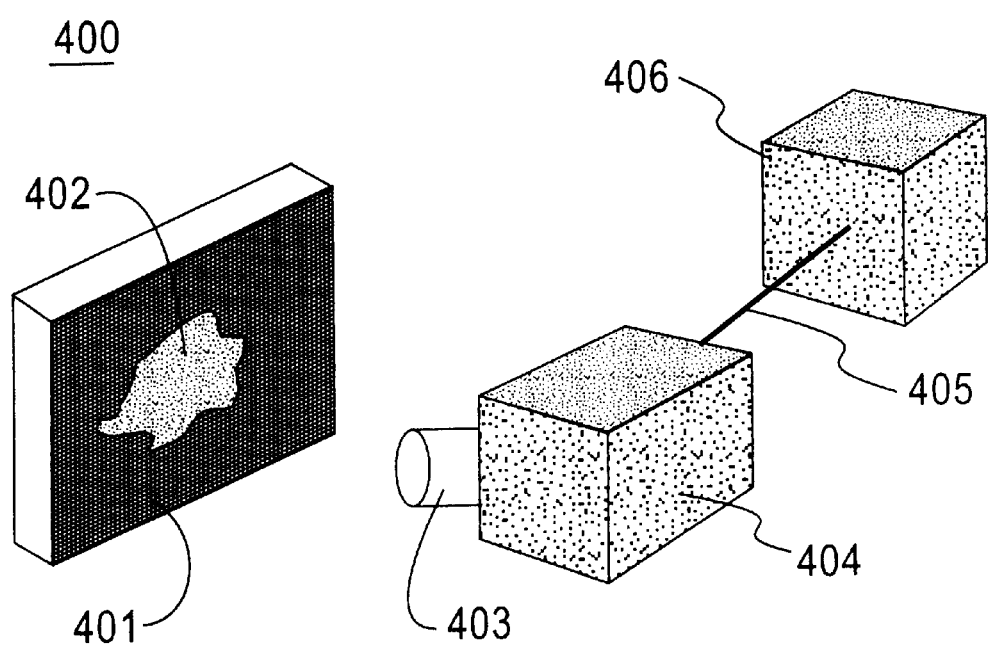
FIG. 4 shows an example of an apparatus embodiment of the current invention.

FIG. 4 shows an example of an apparatus embodying the current invention. Image 400 shows a textured background 401 against which the object 402 is placed. A digital image is captured through a lens 403 which is attached to a digital camera system 404. The digital camera system is connected through a network connection 405 with a personal computer 406. The image of the object against the background is captured by the digital camera system and is stored on the personal computer. The algorithm for segmentation as described in this invention resides in the personal computer, and is applied to the stored image of the object against the background.

Thus the present invention provides a method for visual separation. The method includes providing a digitized image of at least one object upon a textured background, and separating at least one object in the image from the textured background.

In some embodiments of the method, the step of determining a first set of characteristics of at least one object, and the step of establishing the textured background to have a second set of characteristics distinct from the first set of characteristics; and/or the step of determining includes measuring a spatial frequency of image intensity values of the at least one object; and/or the step of establishing includes measuring a spatial frequency of image intensity values of the textured background, or synthesizing the textured background with spatial frequency characteristics distinct from the at least one object; and/or the step of establishing includes employing a particular background from a set of available backgrounds; and/or the step of separating includes identifying a plurality of background pixels of the image associated with the textured background, and assigning all other pixels of the image to the at least one object; and/or the set of available backgrounds includes checkerboard patterns of high spatial frequency; and/or the step of providing includes assembling a collection of at least one object, obtaining a textured background, and producing a digital image of the collection upon the background with a capable device or process; and/or the capable device includes a digital camera, a digital scanner, a frame grabber, a video capture card or any combination of these.

In some embodiments of the method, the step of providing includes assembling a collection of at least one object, obtaining a textured background, and producing a photograph of the collection upon the background with a capable device or process; and/or the capable device includes an analog film-based camera.

Some embodiments of the invention are provided as an article of manufacture comprising a computer usable medium having computer readable program code means embodied therein for causing visual separation. The computer readable program code means in the article of manufacture comprising computer readable program code means for causing a computer to effect the steps of an embodiment of the present invention.

Thus the present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context includes any expression, in any language, code or notation, of a set of instructions intended to cause a system having an information processing capability to perform a particular function either directly or after either or both of the following a) conversion to another language, code or notation; b) reproduction in a different material form.

While the invention has been described in terms of particular preferred embodiments, those skilled in the art will recognize that the concepts of the invention can be practiced with modifications within the spirit and scope of the appended claims.

What is claimed is:

1. A method of separating an object in an image from a background comprising:

Providing a digitized image of at least one object upon a background, said object being stationary with respect to said background and said background having a known texture with a known Fourier power spectrum;

Separating said at least one object in said image from said background by repetitively calculating the Fourier spectral components of the Fourier power spectrum of a block of pixels and assigning the central pixel of said block of pixels to the background if said Fourier power spectrum of said block of pixels satisfies a criterion;

Determining a first period of said known texture;

Establishing said block of pixels with at least one dimension sufficient to determine said first period; and Wherein the step of establishing includes employing a particular background from a set of available backgrounds before said digitized image is formed.

2. A method as recited in claim 1, wherein the step of determining includes comparing a maximum value in said Fourier power spectrum with a value characteristic of said background.

3. A method as recited in claim 1, wherein the step of separating includes at least one step of comparing a value in said Fourier power spectrum that is both characteristic of said background and the maximum value in the power spectrum with the next highest power spectral value.

4. A method as recited in claim 3, said background having checkerboard patterns of high spatial frequency.

5. A computer program product comprising a computer usable medium having computer readable program code means embodied therein for causing visual separation, the computer readable program code means in said computer program product comprising computer readable program code means for causing a computer to effect the steps of claim 3.

6. A method as recited in claim 1, wherein the step of separating includes:
   identifying a plurality of background pixels of said image associated with said background; and
   assigning all other pixels of said image to said at least one object.

7. A computer program product comprising a computer usable medium having computer readable program code means embodied therein for causing visual separation, the computer readable program code means in said computer program product comprising computer readable program code means for causing a computer to effect the steps of claim 6.

8. A method as recited in claim 1, wherein the step of providing includes:
   assembling a collection of said at least one object,
   obtaining said textured background having said known texture and said known Fourier power spectrum, and
   producing a digital image of said collection upon said background employing a capable device and process.

9. A method as recited in claim 8, wherein the capable device is selected from a group including a digital camera, a digital scanner, a frame grabber, a video capture card, or any combination of these.

10. An article of manufacture comprising a computer usable medium having computer readable program code means embodied therein for causing visual separation, the computer readable program code means in said article of manufacture comprising computer readable program code means for causing a computer to effect the steps of claim 8.

11. A method as recited in claim 1, wherein the step of providing includes:
   assembling a collection of at least a particular object from said at least one object,
   obtaining said background having a texture characteristic distinct from the texture characteristic of said collection, and
   producing a photograph, employing a capable device and process, of said collection upon said background having said known texture and said known Fourier power spectrum.

12. A method as recited in claim 11, wherein the capable device includes an analog film-based camera.

13. A computer program product comprising a computer usable medium having computer readable program code means embodied therein for causing visual separation, the computer readable program code means in said computer program product comprising computer readable program code means for causing a computer to effect the steps of claim 11.

14. An article of manufacture comprising a computer usable medium having computer readable program code means embodied therein for causing visual separation, the computer readable program code means in said article of manufacture comprising computer readable program code means for causing a computer to effect the steps of claim 1.

15. A computer program product comprising a computer usable medium having computer readable program code means embodied therein for causing visual separation, the computer readable program code means in said computer program product comprising computer readable program code means for causing a computer to effect the steps of claim 1.

16. An apparatus comprising:
   a digital camera system;
   a lens optically coupled to the digital camera system for capturing a digitized image, the digital camera having an output coupled to a computer; and
   a computer program within said computer for effecting employment of texture for visual separation of at least one object from a background included in the digitized image by effecting the steps of claim 1.

* * * * *